United States Patent
Yoshida

[19]
[11] Patent Number: 6,091,858
[45] Date of Patent: Jul. 18, 2000

[54] METHOD OF CONVERTING CONTINUOUS TONE IMAGE INTO PSEUDO-HALFTONE BINARY IMAGE

[75] Inventor: Yasunari Yoshida, Aichi-ken, Japan

[73] Assignee: Brother Kogyo Kabushiki Kaisha, Nagoya, Japan

[21] Appl. No.: 08/999,454

[22] Filed: Dec. 29, 1997

[30] Foreign Application Priority Data

Dec. 27, 1996 [JP] Japan ................................. 8-350800

[51] Int. Cl.[7] .............................. G06K 9/36; G06K 9/38; G06K 9/46
[52] U.S. Cl. ......................... 382/252; 382/237; 358/455; 358/456
[58] Field of Search ..................................... 382/252, 232, 382/237, 251, 270; 358/455, 456, 465, 466

[56] References Cited

U.S. PATENT DOCUMENTS

| | | | |
|---|---|---|---|
| 5,260,810 | 11/1993 | Kanno et al. | 358/462 |
| 5,325,448 | 6/1994 | Katayama et al. | 358/430 |
| 5,479,538 | 12/1995 | Takahashi | 382/270 |

OTHER PUBLICATIONS

"An Adaptive Algorithm for Spatial Greyscale", Robert W. Floyd and Louis Steinberg, SID 17, 1976, p. 1, lines 11–13.

Primary Examiner—Thomas D. Lee
Attorney, Agent, or Firm—Oliff & Berridge, PLC

[57] ABSTRACT

When a subject pixel has been turned OFF, an accumulated error value is calculated based on binary conversion. Then, the sum of the accumulated error value and the binary conversion error for the subject pixel is compared with a predetermined value. When the sum is less than the predetermined value, the binary conversion error for the subject pixel is multiplied with a coefficient so that the absolute value of the binary conversion error is decreased. Then, the absolute-decreased error is distributed to unprocessed neighboring pixels according to an error distribution matrix. Then, the binary conversion error for the subject pixel is stored in a working memory as a binary conversion error for the s-th pixel to be used in the process of the next pixel.

18 Claims, 10 Drawing Sheets

FIG. 2

|  | i=-2 | i=-1 | i=0 | i=1 | i=2 |
|---|---|---|---|---|---|
| j=0 |  |  | * (SUBJECT PIXEL, PIXEL POSITION (x,y)) | 7/48 | 5/48 |
| j=1 | 3/48 | 5/48 | 7/48 | 5/48 | 3/48 |
| j=2 | 1/48 | 3/48 | 5/48 | 3/48 | 1/48 |

~Bmat( )

ERROR DIFFUSION PROCESS

METHOD OF CONVERTING CONTINUOUS TONE IMAGE INTO PSEUDO-HALFTONE BINARY IMAGE

BACKGROUND OF THE INVENTION

1. Field of the Invention

The present invention relates to a method of converting continuous tone images into pseudo-halftone binary images through an error distribution binary conversion method.

2. Description of Related Art

An error diffusion binary conversion process has been proposed by Floyd, et al. in "An Adaptive Algorithm for Spatial Greyscale," SID 17 [1976]. This error diffusion binary conversion process can convert a natural image comprised of plural tone levels into a high quality binary image.

SUMMARY OF THE INVENTION

It is conceivable to provide a method of FIG. 1 for converting continuous tone images into pseudo-halftone images with the error diffusion binary conversion method as described below.

When the process is started, an error buffer, to be described later, is initialized to have zero values, and the following processes are started.

First, variables x and y are initialized to zero (0) in S1 and S2. The variables x and y are for defining a subject pixel position (x, y) of the continuous tone image whose density I is to be converted into a binary value. It is noted that a main scanning direction x is defined along each pixel line, and an auxiliary scanning direction y is defined to be perpendicular to the main scanning direction x. During this process, the pixel lines (main scanning lines) are processed from top to bottom in the auxiliary scanning direction y. In each pixel line, the pixels are processed from left to right along the main scanning direction.

Then, input density $I(x,y)$ (where $0 \leq I \leq 255$) for the subject pixel (x, y) of the input continuous tone image is retrieved in S3. Then, an error sum $e(x, y)$ is retrieved from a corresponding memory location (x, y) in the error buffer. The error sum $e(x,y)$ is an accumulated amount of errors distributed from already-processed neighboring pixels. The density value $I(x, y)$ is then modified by the error sum $e(x, y)$ in S4. That is, a modified density $I'(x, y)$ is calculated through the following formula (1):

$$I'(x, y) = I(x, y) + e(x, y) \qquad (1)$$

Then, in S6, the modified density $I'(x, y)$ is compared with a predetermined binarization threshold value T. When $I'(x, y) \geq T$ (no in S6), the subject pixel is turned ON in S12. That is, the subject pixel density is converted into an output density value $O(x,y)$ of one (1). When $I'(x, y) < T$ (yes in S6), on the other hand, the subject pixel is turned OFF in S7. That is, the subject pixel density is converted into an output density value $O(x,y)$ of zero (0).

Then, a binary conversion error $E(x, y)$ is calculated for the subject pixel (x, y) in the following formula (2):

$$E(x, y) = I'(x, y) - O(x, y) \qquad (2)$$

where $O(x, y)$ is set to 255 when $O(x, y)$ has been set to ON (1) in S12, and $O(x, y)$ is set to zero (0) when $O(x, y)$ has been set to OFF (0) in S7.

Thus produced binary conversion error $E(x, y)$ is then distributed to the error buffer at a location (x+i, y+j) for each of neighboring twelve pixels not yet processed. The binary conversion error is distributed to the neighboring pixels in a weighted basis defined by a predetermined error diffusion matrix Bmat( ) through the following formula (3):

$$e(x+i, y+j) += Bmat(i,j) \times E(x, y) \qquad (3)$$

wherein += is an operator for calculating a sum of a distributed fraction of the error $E(x, y)$ and a value already stored in the error buffer (x+i, y+j) and for storing the calculated sum into the same error buffer (x+i, y+j). A representative example of the matrix Bmat ( ) is shown in FIG. 2. In the matrix Bmat( ), * indicates a subject pixel position (x, y), and each value in the matrix indicates a coefficient to be multiplied with the error $E(x, y)$ before being distributed to a neighboring pixel (x+i, y+j), which is located relative to the subject pixel (x, y) as shown in the matrix. The thus distributed error fractional portion is accumulated in a corresponding memory location (x+i, y+j) in the error buffer according to the formula (3). For example, the next pixel (x+1, y) on the same pixel line with the subject pixel (x, y) receives a $7/48^{th}$ part of the error $E(x, y)$. The $7/48^{th}$ part of the error $E(x, y)$ is therefore accumulated in the corresponding memory location (x+1, y) of the error buffer.

Next, in S10, it is judged whether or not all the pixels in the present pixel line along the main scanning direction (x direction) have been processed. When any pixels remain unprocessed (no in S10), a pixel position is shifted to the next pixel position (x+1, y) in S13, and the process returns to S3. Then, the process from S3 is repeated. When all the pixels have been processed in the subject pixel line (yes in S10), on the other hand, it is judged in S11 whether or not all the pixels in the input image have been processed. When any pixels remain unprocessed (no in S11), the pixel position is shifted to the next pixel line in the auxiliary scanning direction y in S14. Then, the process returns to S2. Then, the process from S2 is repeated. When all the pixels have been processed (yes in S11), this process ends. Thus, the inputted continuous tone image is completely converted into a pseudo-halftone image.

It is noted that the threshold value T employed in the above-described error diffusion process is set to a value of about 50% of the highest density value inputtable as a density for inputtable continuous tone images. In this example where the input density I is in a range of zero (0) to 255, the threshold T is set to about 128. Pixels in a relatively-high density region in the input image are likely to be converted into ON (1) in S12. Binary conversion errors $E(x,y)$ are likely to become negative values according to the formula (2) during the binary conversion process for pixels in high density regions. The fractional portions of the negative errors are then distributed to error buffers for neighboring pixels. Accordingly, the error buffers for pixels neighboring to the high density regions are likely to be accumulated with negative values with large absolutes.

It is now assumed that the input continuous tone image has two density regions A and B shown in FIG. 3(a). The region A presents a uniform high density, and the region B presents a uniform density lower than that of the region A. The high density region A is located in an upper side of the region B in the auxiliary scanning direction y. Accordingly, when this image is subjected to the binary conversion process of FIG. 1, pixels in the region A are subjected to the error conversion process immediately before pixels in the region B. It is noted that the region B includes an upper side area D which is located directly below the region A. Pixels in this area D will therefore be subjected to the binary conversion process of FIG. 1 directly after the pixels in the region A. In other words, the pixels in the area D will be affected by errors distributed from the region A directly or indirectly. The error buffers for the pixels in the area D will therefore be accumulated with negative values with relatively large absolutes. Being affected with the large-absolute negative errors distributed from the region A, pixels in the area D will likely be turned OFF. As a result, a rate of the number of turned-OFF pixels relative to the total number of pixels in the area D will greatly decrease in comparison with remaining areas in the region B.

More specifically, the input image of FIG. 3(a) is converted into a pseudo-halftone binary image shown in FIG. 3(b) through the binary conversion process of FIG. 1. The high density region A is converted into a high density region "a". The low density region B is converted into a low density region "b". In this image of FIG. 3(b), a portion "d" corresponds to the area D and becomes entirely white regardless of the original density of the area D (i.e., the original density of the region B). Accordingly, the region "b" in the binary image of FIG. 3(b) fails to present a uniform density. The quality of the pseudo-halftone image of FIG. 3(b) becomes considerably low.

It is therefore an object of the present invention to provide an improved method for converting continuous halftone images into pseudo-halftone images through using the error diffusion binary conversion method while negating disadvantages obtained due to accumulation of negative errors diffused from high density regions into low density regions.

In order to attain the above and other objects, the present invention provides a method for converting continuous tone image data into pseudo-halftone image data, the method comprising the steps of: successively converting density data of a plurality of pixels arranged in a continuous tone image into binary values of ON and OFF through comparing the subject pixel densities with a predetermined threshold value, with binary conversion errors defined between the original pixel density and the binary-converted pixel density being affected onto unprocessed neighboring pixels at a degree; and adjusting the degree, at which the binary conversion error obtained at each subject pixel is affected to its neighboring unprocessed pixels, dependently on a state of binary conversion errors obtained for already-processed pixels located adjacent to the subject pixel.

According to another aspect, the present invention provides a program storage medium for storing data of a program indicative of a process for converting continuous tone image data into pseudo-halftone image data, the program comprising: a program of successively converting density data of a plurality of pixels arranged in a continuous tone image into binary values of ON and OFF through comparing the subject pixel densities with a predetermined threshold value, with binary conversion errors defined between the original pixel density and the binary-converted pixel density being affected onto unprocessed neighboring pixels at a degree; and a program of adjusting the degree, at which the binary conversion error obtained at each subject pixel is affected to its neighboring unprocessed pixels, dependently on a state of binary conversion errors obtained for already-processed pixels located adjacent to the subject pixel.

According to still another aspect, the present invention provides a printer for converting continuous tone image data into pseudo-halftone image data and for printing the pseudo-halftone image, the printer comprising: means for successively converting density data of a plurality of pixels arranged in a continuous tone image into binary values of ON and OFF through comparing the subject pixel densities with a predetermined threshold value, with binary conversion errors defined between the original pixel density and the binary-converted pixel density being affected onto unprocessed neighboring pixels at a degree; means for adjusting the degree, at which the binary conversion error obtained at each subject pixel is affected to its neighboring unprocessed pixels, dependently on a state of binary conversion errors obtained for already-processed pixels located adjacent to the subject pixel; and means for printing a pseudo-halftone image based on the binary value obtained for each pixel.

BRIEF DESCRIPTION OF THE DRAWINGS

The above and other objects, features and advantages of the invention will become more apparent from reading the following description of the preferred embodiment taken in connection with the accompanying drawings in which:

FIG. 2 illustrates a structure of an error diffusion matrix employed in the process of FIG. 1;

FIGS. 3(a) and 3(b) illustrate how a leading end in a low density region, located immediately after a high density region, is converted into an undesirable white area, in which FIG. 3(a) illustrates an original continuous tone image, and FIG. 3(b) illustrates a pseudo-halftone image, into which the image of FIG. 3(a) is converted;

DETAILED DESCRIPTION OF THE INVENTION

Figure 1:
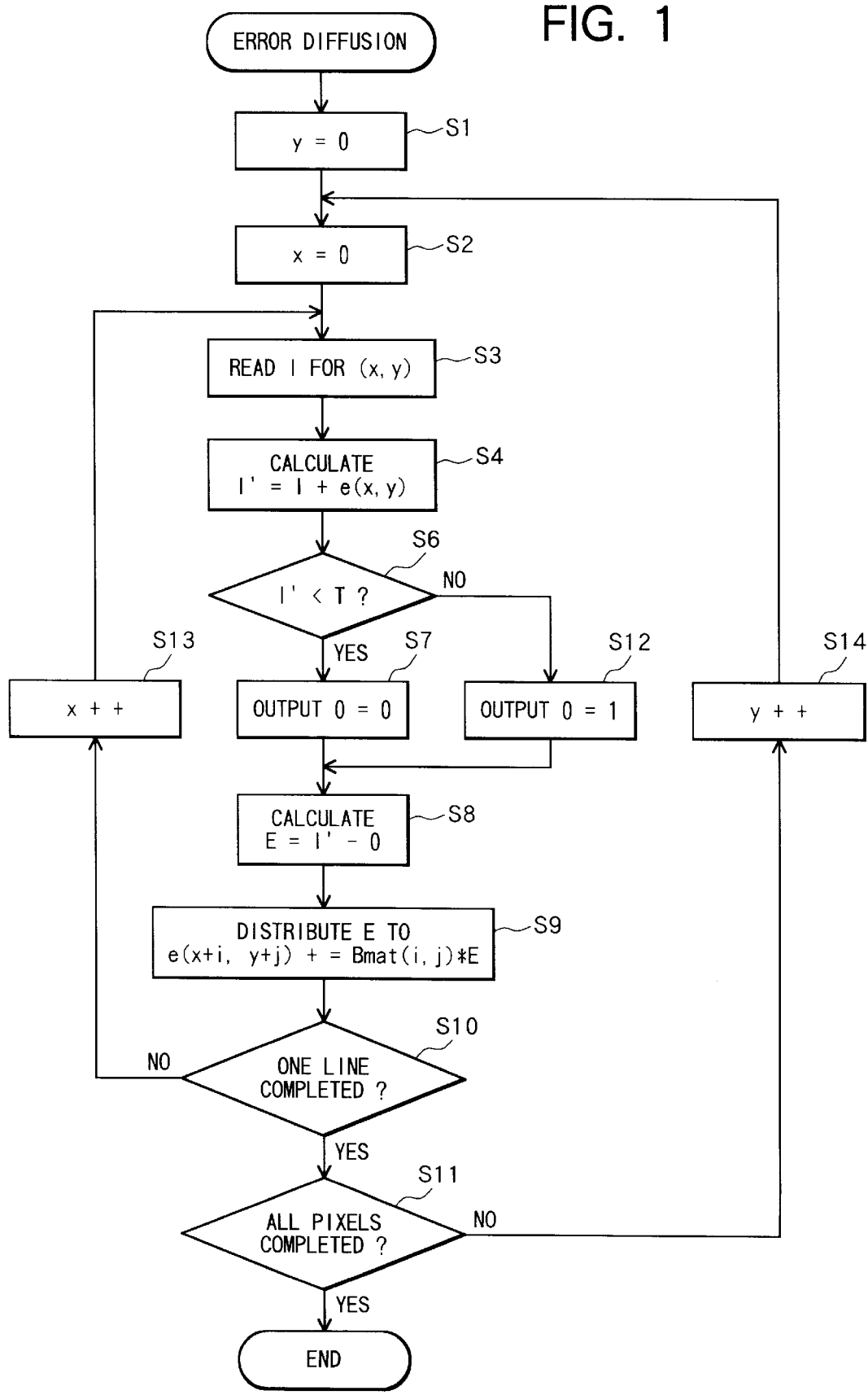
FIG. 1 is a flow chart of a conceivable error diffusion image conversion process.
Figure 3:
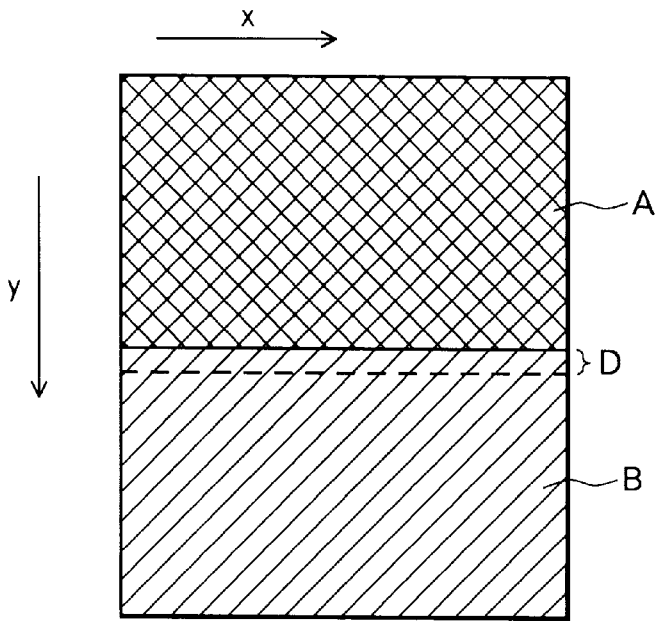
Figure 3:
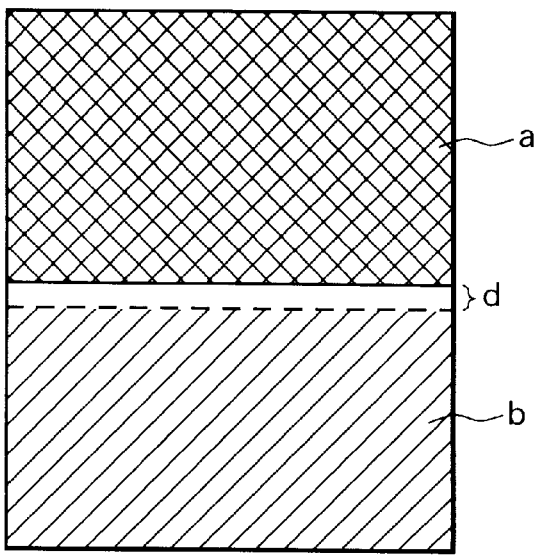

First, the principle of the present invention will be described in greater detail.

According to the present invention, pixels in a continuous tone image are successively converted into binary values of ON and OFF through comparing the subject pixels with a predetermined threshold value. Binary conversion errors obtained between the original pixel density and the binary-converted pixel density are affected onto unprocessed neighboring pixels. The degree, at which the binary conversion error obtained at the subject pixel is affected to the neighboring unprocessed pixels, is adjusted dependently on a state of binary conversion errors obtained at already-processed pixels that are adjacent to the subject pixel.

It is noted that the positional relationship between the subject pixel and the already-processed adjacent pixels may be determined differently from the positional relationship between the subject pixel and the neighboring unprocessed pixels.

For example, the already-processed adjacent pixels can be defined as several pixels that are successively arranged along the main scanning direction and that are located preceding the subject pixel. It is assumed that the number of the preceding successive pixels is N (where N is an integer higher than zero (0)). The N number of successive pixels have been processed one by one along the main scanning direction from a leading end pixel toward a trailing end pixel through the N number of times' worth of binary conversion processes. The trailing end pixel in the successive pixels is located immediately preceding the subject pixel in the main scanning direction, and therefore has been processed immediately before the subject pixel. The leading end pixel is located in an upstream side of the trailing end pixel and is away from the trailing end pixel by the (N−1) pixels' worth of positions. For example, the already-processed adjacent preceding pixels may be defined by twelve, at maximum, successive pixels (x−12, y), (x−11, y), . . . , and (x−1, y) that are located immediately prior to the subject pixel (x, y) and that are located in the same pixel line with the subject pixel (x, y).

The state of the binary conversion errors obtained at the already-processed adjacent pixels may be indicated by a sum of the binary conversion errors obtained at the already-processed adjacent pixels. Or, the state of the binary conversion errors may be indicated by a sum of the binary conversion errors obtained at the already-processed adjacent pixels and the binary conversion error produced at the subject pixel. When the sum of the errors is lower than a predetermined negative value, the degree, at which the binary conversion error is affected to the neighboring unprocessed pixels, may be preferably decreased. That is, when the sum of the binary conversion errors obtained at the already-processed adjacent pixels has a negative value whose absolute being larger than a certain amount, it can be estimated that those already-processed adjacent pixels have been originally located in a relatively high density region. The already-processed adjacent pixels therefore include a large number of turned-ON pixels. If the subject pixel is located within or adjacent to a low density region that is located following the high density region, the subject pixel will be undesirably converted into a white dot regardless of its original density. As a result, an undesirable whitened area will be produced at the subject pixel and at its neighboring unprocessed pixels.

According to the present invention, therefore, the binary conversion error, occurred at the subject pixel, is not entirely affected onto its neighboring unprocessed pixels. However, adjustment is performed to decrease the effects of the subject pixel error onto the neighboring unprocessed pixels. For example, adjustment may be performed so as to decrease the absolute value of the binary conversion error occurred at the subject pixel before distributing the binary conversion error to neighboring unprocessed pixels. The error may be multiplied by a positive coefficient lower than one (1). Or, the error may be added with a positive value. The error may not be distributed to the neighboring pixels at all. In other words, the error may be changed to zero (0).

Thus, the adjustment provided according to the present invention can decrease the effects of the negative error onto neighboring unprocessed pixels. This adjustment can be employed in the error diffusion binary conversion process. That is, the adjustment is performed when the binary conversion error, occurred at the subject pixel, is to be distributed to neighboring unprocessed pixels immediately after the density at the subject pixel is converted into a binary value. For example, density data of each pixel may be converted into a binary value through comparing the pixel density, modified by an error diffused from its already-processed neighboring pixels, with a predetermined threshold value through the error diffusion method. The binary conversion error may be diffused as it is to its unprocessed neighboring pixels when the sum of the binary conversion errors for the already-processed adjacent pixels is judged as equal to or higher than the predetermined negative value. The binary conversion error may be multiplied by the predetermined coefficient before being diffused to its unprocessed neighboring pixels when the sum of the binary conversion errors for the already-processed adjacent pixels is judged as lower than the predetermined negative value. The neighboring unprocessed pixels for the subject pixel (x, y) may be defined by twelve pixels (x+1, y), (x+2, y), (x−2, y+1), (x−1, y+1), (x, y+1), (x+1, y+1), (x+2, y+1), (x−2, y+2), (x−1, y+2), (x, y+2), (x+1, y+2), and (x+2, y+2), for example. The already-processed adjacent pixels for the subject pixel (x, y) may be defined by twelve, at maximum, successive pixels (x−12, y), (x−11, y), . . . , (x−2, y), and (x−1, y), for example.

The adjustment can be employed in other various types of error distributing binary conversion methods. For example, the adjustment can be employed in an minimized average error method. That is, the adjustment can be performed so that each of the neighboring unprocessed pixels will receive a fraction of the adjusted binary conversion error occurred at the subject pixel before the neighboring unprocessed pixel is converted into a binary value. For example, density data of each pixel may be converted into a binary value through comparing the pixel density, modified by errors distributed from its already-processed neighboring pixels, with a predetermined threshold value through the minimized average error method. Then, a binary conversion error obtained for the subject pixel may be stored as it is when the sum of the binary conversion errors for the already-processed adjacent pixels is judged as equal to or higher than the predetermined negative value. The thus stored binary conversion error will be used when the unprocessed neighboring pixels are converted into binary values. The binary conversion error may be multiplied by the predetermined coefficient before being stored when the sum of the binary conversion errors for the already-processed adjacent pixels is judged as lower than the predetermined negative value. The thus adjusted and stored binary conversion error will be used when the unprocessed neighboring pixels are converted into binary values. The sign of the adjusted binary conversion error may be reversed, and the sign-reversed adjusted binary conversion error may be further distributed back to the already-processed neighboring pixels. The thus distributed error will be used together with the binary conversion errors obtained at the already-processed neighboring pixels when the unprocessed neighboring pixels are converted into binary values. The already-processed neighboring pixels for the subject pixel (x, y) may be defined by twelve pixels (x−2, y−2), (x−1, y−2), (x, y−2), (x+1, y−2), (x+2, y−2), (x−2, y−1), (x−1, y−1), (x, y−1), (x+1, y−1), (x+2, y−1), (x−2, y), and (x−1, y), for example. The already-processed adjacent pixels for the subject pixel (x, y) may be defined by twelve, at maximum, successive pixels (x−12, y), (x−11, y), . . . , (x−2, y), and (x−1, y), for example.

When a continuous tone image is subjected to any error distributing binary conversion methods employed with the above-described adjustment operation, the resultant pseudo-halftone images will not be formed with any undesirable white areas at a transition area from a high density region toward a lower density region. Or, even when the undesirable white area is produced at the transition area, the white area will not appear noticeably. The pseudo-halftone images will have desirable high quality.

Only when the subject pixel is turned OFF, a calculation processing may be performed to calculate the sum of the binary conversion errors occurred at the already-processed adjacent pixels. The sum is indicative of the binary error state of the already-processed adjacent pixels. When the subject pixel is turned ON, on the other hand, the binary conversion error sum for the already-processed adjacent pixels may be set to zero (0). Then, it may be judged whether or not the binary conversion error sum for the already-processed adjacent pixels is smaller than a predetermined negative value. When the binary conversion error sum is smaller than the predetermined negative value, it can be confirmed that the subject pixel is located in a transition area from a high density region toward a low density region. More specifically, it can be confirmed that the subject pixel is located in a leading end of the low density region and therefore is processed immediately after pixels in the high density region. According to the present invention, when the subject pixel is confirmed to be located at the transition position, the adjustment may be performed so as to decrease the absolute value of the negative error, occurred at the subject pixel, before distributing the error to remaining unprocessed pixels in the low density region. It is therefore possible to prevent the large-absolute negative error from being largely distributed to the remaining unprocessed pixels in the low density region. It is possible to prevent occurrence of the undesirable whitened area.

The above-described binary conversion method may be preferably stored as data of a program which will be executed by a computer system. The program data may be previously stored in a data storage medium such as a floppy disk, a magnetooptic disk, or a CD-ROM. The program may be loaded into the computer system as required. Or, the program may be stored in a data storage medium such as a ROM or a back up RAM. The data storage medium may be installed into the computer system.

The method for converting continuous tone images into pseudo-halftone images according to preferred embodiments of the present invention will be described below while referring to the accompanying drawings wherein like parts and components are designated by the same reference numerals.

A first embodiment will be described below with reference to FIGS. 4 through 6.

Figure 4:
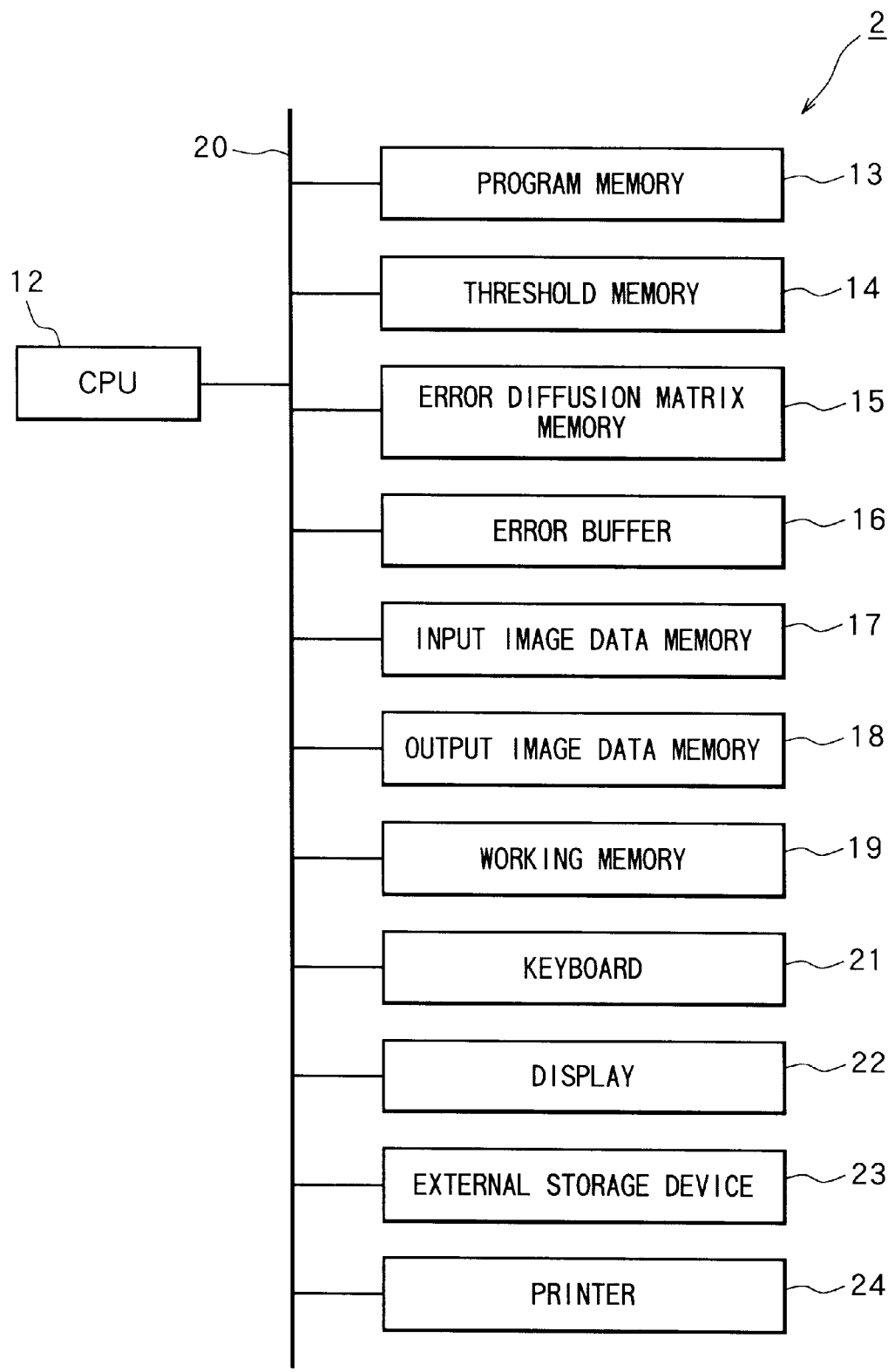
FIG. 4 is a block diagram of an image data conversion device of a first embodiment of the present invention.

FIG. 4 is a block diagram of a continuous tone image data conversion device 2 for performing the continuous tone image conversion method of the present embodiment. More specifically, the device 2 is provided to convert input continuous tone images formed with 256 different tone levels 0 to 255 into binary pseudo-halftone output images through the image conversion method of the present embodiment.

A main part of the image conversion device 2 is constructed from a computer. The computer includes: a CPU 12; a program memory 13 constructed from a ROM; a threshold storage portion 14 constructed from a RAM; an error distribution matrix storage memory 15 constructed from another RAM; an error buffer 16 also constructed from another RAM; an input image memory 17 also constructed from another RAM; an output image memory 18 constructed from still another RAM; and a working memory 19 constructed from another RAM. The respective elements 12 through 19 are connected to one another via a bus line 20 to exchange control signals and data signals therebetween.

The image conversion device 2 is further provided with: input/output elements, such as a keyboard 21, a mouse device (not shown), and a display 22, which are required for the device 2 to perform a computing operation; an external data storage device 23 such as a hard disk drive and a floppy disk drive; and a printer 24. These elements 22 through 24 are also connected to the elements 12–19 via the bus 20.

Figure 5:
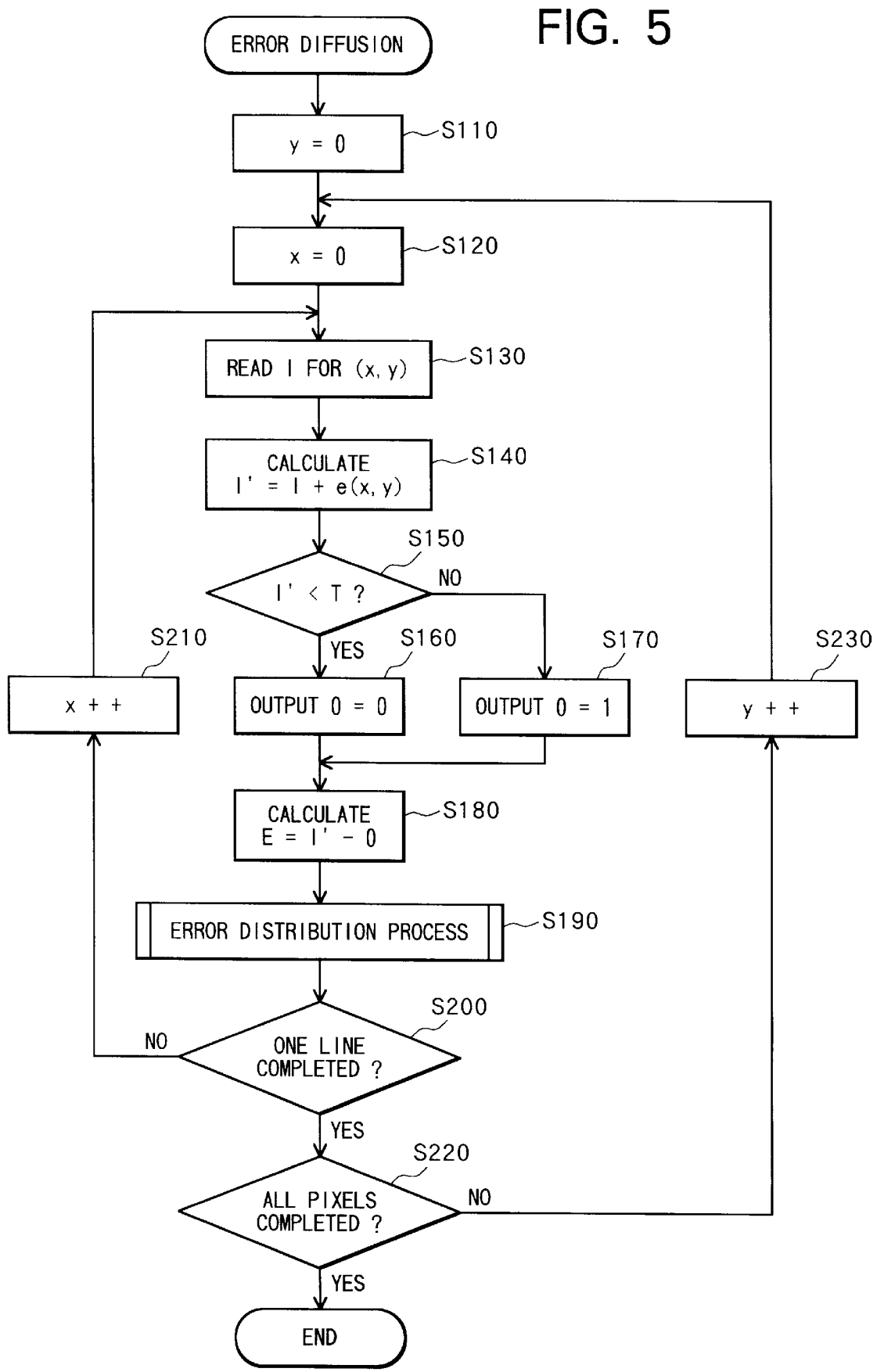
FIG. 5 is a flow chart of an error diffusion image conversion process of the first embodiment.
Figure 6:
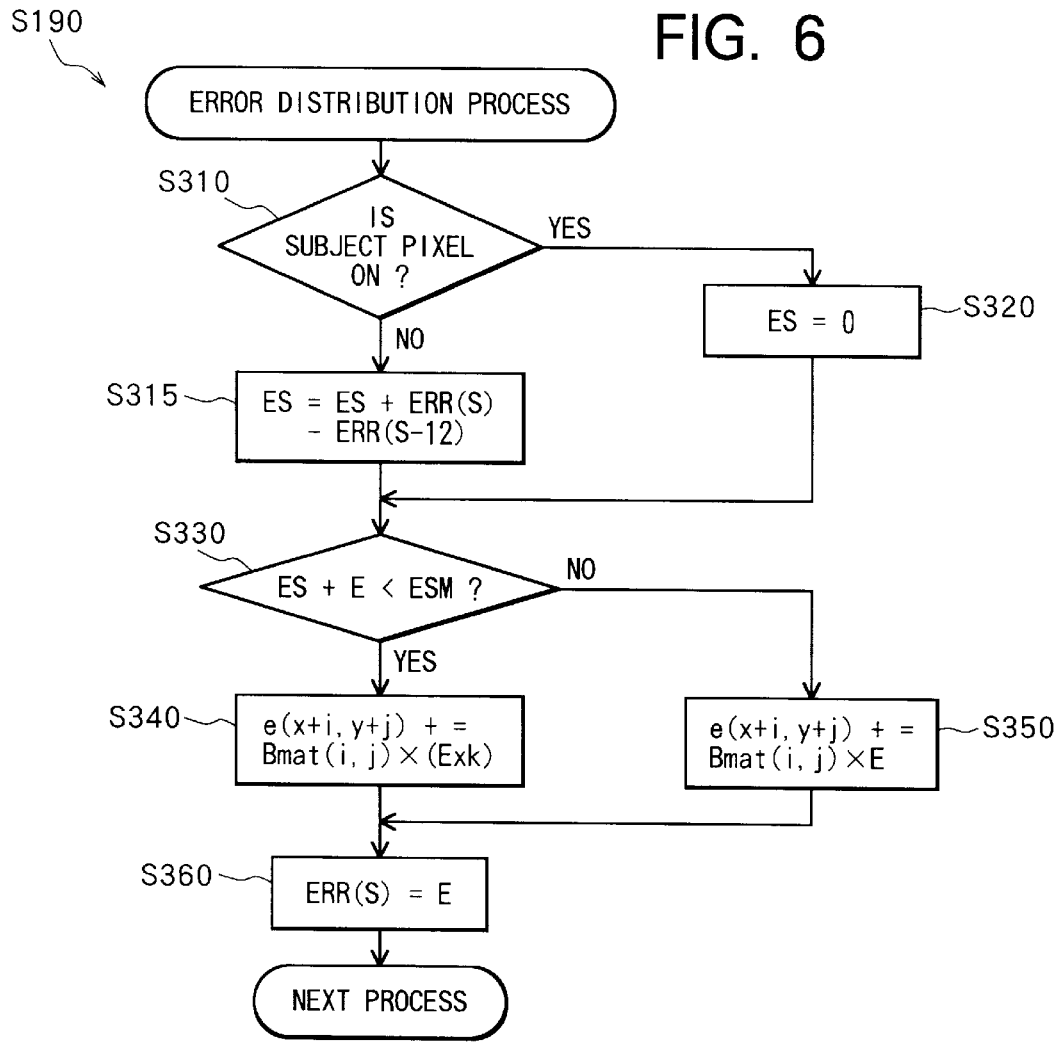
FIG. 6 is a flowchart of an error diffusion process in the process of FIG. 5.

The program storage portion 13 previously stores therein: data of a basic program required for the device 2 to perform a computing operation; data of a program of an error diffusion image conversion process as shown in FIGS. 5 and 6 for (converting continuous tone images into pseudo-halftone binary images; and data of other various processing programs. Each program is executed by the CPU 12 when required. It is noted that data of those programs may be previously stored in a floppy disk, a magnetooptical disk, a CD-ROM or the like. When required, data of the programs is retrieved from these data storage media by the operation of the external data storage device 23 and is written into the working memory 19.

The threshold storage portion 14 is for storing a threshold IP to be used in the error diffusion image conversion process of FIGS. 5 and 6. The error distribution matrix storage portion 15 previously stores therein the error diffusion matrix Bmat( ) shown in FIG. 2. As shown in FIG. 2, the error distribution matrix Bmat( ) indicates: neighboring pixels, to which fractions of a binarization error, occurred at a certain pixel (indicated by the mark *) during the error diffusion image conversion process of FIGS. 5 and 6, should be distributed; and distribution rates at which the error fractions are distributed to the neighboring pixels.

The error buffer 16 is for storing error fractions distributed to each pixel from its neighboring pixels. The input image data storage portion 17 is for storing therein density data of a continuous tone image inputted from the external storage element 23 or the like to be converted into a pseudo-halftone image. Density of each pixel is in a range of zero (0) to 255. The output image data storage portion 18 is for storing therein pseudo-halftone image data which is obtained when the continuous tone image data in the storage portion 17 is subjected to the error diffusion image conversion process of FIGS. 5 and 6. When required, the thus obtained pseudo-halftone image data is displayed on the display 22 or is recorded by the printer 24.

With the above-described structure, the device 2 of the present embodiment converts a continuous tone image into a pseudo-halftone image through the error diffusion image conversion method of FIGS. 5 and 6. During the error diffusion image conversion process, each pixel density value is compared with the predetermined threshold value T retrieved from the memory 14. Based on the compared result, the pixel density value is converted into a binary value. An error occurred through the binarization operation is affected to neighboring pixels not yet processed.

The error diffusion image conversion process of the present embodiment will be described below with reference to FIGS. 5 and 6. This process is executed by the CPU 12 to convert density data of a continuous tone image stored in the input image data memory 17 into data of a pseudo-halftone image.

When the error diffusion image conversion process is started, variables x and y are first initialized to zero (0) in S110 and S120. The variables x and y are for defining a subject pixel position (x, y) of a continuous tone image whose density I is to be converted into a binary value. It is noted that a main scanning direction x is defined along each pixel line, and an auxiliary scanning direction y is defined perpendicular to the main scanning direction x. During the process of FIGS. 5 and 6, the pixel lines (main scanning lines) are processed from top to bottom in the auxiliary scanning direction y. In each pixel line, the pixels are processed from left to right along the main scanning direction.

Then, in S130, input density I(x,y) (where 0≦I≦255) of a subject pixel (x, y) in the continuous tone image is retrieved from the memory 17.

An error sum e(x, y) is retrieved from a corresponding memory location (x, y) in the buffer memory 16. The error sum e(x,y) is an accumulated amount of errors distributed from already-processed neighboring pixels.

The density value I(x, y) is then modified by the error sum e(x, y) in S140 through the already-described formula (1). That is, I'(x, y)=I(x, y)+e (x, y). Then, in S150, the modified density I'(x, y) is compared with the threshold T which has been retrieved from the memory 14. The threshold value T is 128, for example.

When I'(x, y)≧T (no in S150), the subject pixel is turned ON in S170. That is, the subject pixel density is converted into an output density value O(x,y) of one (1). When I'(x, y)<T (yes in S150), on the other hand, the subject pixel is turned OFF in S160. That is, the subject pixel density is converted into an output density value O(x,y) of zero (0). The thus obtained output density value O(x,y) is stored in the output image data memory 18 as pseudo-halftone binary image data. While the processes from S120–S220 are repeated, therefore, the density values O(x,y) of successive series of pixels are stored in the memory 18.

Next, in S180, a binary conversion error E(x, y) is calculated for the subject pixel (x, y) through the already-described formula (2). That is, E(x, y)=I'(x, y)−O(x, y) where O(x, y) is set equal to 255 when O(x, y) has been set to ON (1) in S170, and O(x, y) is set equal to zero (0) when O(x, y) has been set to OFF (0) in S160.

Then, the thus produced binary conversion error E(x, y) is distributed to neighboring pixels in S190.

It is noted that during the error distribution process of S190, the binary conversion error E(x, y) is stored in the working memory 19 as one of twelve errors ERR(1) through ERR(12). When the subject pixel (x, y) is located at the leading end in each pixel line, that is, (x, y)=(0, y), the corresponding error E(0, y) is stored as a first error ERR(1). When the subject pixel is the second pixel (1, y) in one pixel line, the corresponding error E(1, y) is stored as a second error ERR(2). Thus, when the x-coordinate of the subject pixel (x, y) is in a range of 0 to 11, the corresponding error E(x, y) is stored as a s-th error ERR(s) where 1≦s(=x+1)≦12. Then, as the x-coordinate of the subject pixel (x, y) increases further one by one, the corresponding error E(x, y) will be always stored as the twelfth error ERR(s) where s=12, and the errors E(x−12, y) through E(x−1, y), which are already stored as the errors ERR(1) through ERR(12) in the working memory 19, will be shifted one by one to values ERR(0) through ERR(11). Thus, the values ESS(s) are stored in thirteen memory areas which are used cyclically at a unit of thirteen (13).

During the process of S190, before the error E(x, y) for the subject pixel (x, y) is thus stored as the corresponding error ERR(s) (where s=x+1 if 0≦x≦11 and s=12 where 12≦x), an accumulated error ES is calculated for errors obtained at some preceding pixels that are successively arranged adjacent to and immediately prior to the subject pixel (x, y). The accumulated error ES may possibly be calculated for errors obtained at twelve, at maximum, preceding pixels (x−13, y) through (x−1, y).

This error distribution process of S190 will be described below in greater detail with reference to FIG. 6.

First, it is judged in S310 whether or not the subject pixel (x, y) has been turned ON in S170. When it is judged in S310 that the subject pixel has been turned ON (yes in S310), the accumulated error value ES is cleared to zero (0) in S320. Then, the program proceeds to S330. When the subject pixel has been turned OFF in S160 (no in S310), on the other hand, the accumulated error value ES is calculated for the subject pixel (x, y) in S315. That is, the present value of the accumulated error ES, which has been calculated at the preceding pixel (x−1, y) during the latest routine of S130–S210, is added with the binary conversion error E(x−1, y), which has been obtained at the preceding pixel (x−1, y) and which has been set as the value ERR(s) in the latest routine. If the thus calculated value ES becomes accumulation of errors E(x−13, y) through E(x−1, y) which have been obtained at the preceding successive thirteen pixels (x−13, y)–(x−1, y), the binary conversion error E(x−13, y), which is now set as the value ERR(s−12), is subtracted from the sum of the value ES and the binary conversion error E(x−1, y). Then, the program proceeds to S330.

Thus, the accumulated error value ES is calculated for the subject pixel (x,y) in S320 and S315 differently according to the judgment result in S310. The accumulated error value ES is defined as a total value of binary conversion errors E that have been obtained for twelve or less number of pixels that are processed prior to the subject pixel (x, y) and that are arranged in the same pixel line with the subject pixel (x, y) along the main scanning direction. In this example, the accumulated error value ES is defined as a total value of binary conversion errors E obtained for one or more successive pixels that are arranged in the same pixel line with the subject pixel (x, y) and that have been processed immediately prior to the subject pixel. Those one or more successive pixels are defined as already-processed successive pixels located adjacent to and located preceding the subject pixel. The number of the already-processed adjacent preceding pixels is twelve at maximum. That is, when twelve or more successive pixels preceding the subject pixel (x, y) along the main scanning direction x have been turned OFF, the accumulated error ES calculated in S315 becomes equal to the sum of errors E(x−12, y) through E(x−1, y) obtained for the twelve successive preceding pixels (x−12, y) to (x−1, y). When only two successive pixels (x−2, y) and (x−1, y) have been successively turned OFF prior to the subject pixel (x, y), the accumulated error ES becomes equal to the sum of the errors E(x−3, y) through E(x−1, y), which are obtained for only three successive preceding pixels (x−3, y) to (x−1, y), wherein the pixel (x−3, y) has been turned ON for the last time before the subject pixel (x, y). To summarize, when i-number of successive pixels (x−i, y) through (x−1, y) have been turned OFF prior to the subject pixel (x, y) where i is an integer (1≦i≦11), the accumulated error ES, calculated in S315, becomes equal to the sum of errors E(x−(i+1), y) through E(x−1, y), which are obtained for (i+1)-number of successive preceding pixels (x−(i+1), y) through (x−1, y), wherein the pixel (x−(i+1), y) has been turned ON for the last time before the subject pixel (x, y). When the preceding pixel (x−1, y) is turned ON and the subject pixel (x, y) is turned OFF, the accumulated error ES becomes equal to E(x−1, y).

Then, the program proceeds to S330. In S330, it is judged whether or not a sum of the present accumulated error ES, determined in S315 or S320, and the binary conversion error E(x, y) calculated in S180 for the subject pixel (x,y) is smaller than a predetermined value ESM. This predetermined value ESM is fixed as a negative value. Representative examples for the value ESM are −500 and −480. It is noted that response at the judgment of S330 can be adjusted through changing the value ESM or the possible maximum number of the already-processed adjacent preceding pixels from twelve (12).

When ES+E<ESM (YES in S330), the binary conversion error E(x, y) for the subject pixel (x, y) is multiplied with a coefficient k where 0<k<1. For example, k is equal to 0.25. Thus, the absolute value of the binary conversion error E(x, y) is decreased. The thus absolute-decreased binarization error "E(x, y)×k" is then distributed to an error buffer (x+i, y+j) for each of neighboring twelve pixels not yet processed. That is, the absolute-decreased error "k×E(x, y)" is distributed to the neighboring unprocessed twelve pixels in a weighted basis defined by the predetermined error diffusion matrix Bmat ( ) as expressed by the following formula (4):

$$e(x+i, y+j) += Bmat(i,j) \times E(x, y) \times k \quad (4)$$

wherein += is an operator for calculating a sum of a distributed fraction of the adjusted error "k×E(x, y)" and a value already stored in the error buffer (x+i, y+j) and for storing the calculated sum in the error buffer (x+i, y+j). A representative example of the matrix Bmat (,) is shown in FIG. 2. Thus, the fractions of the adjusted error "k×E(x, y)" are distributed to the twelve neighboring unprocessed pixels (x+1, y), (x+2, y), (x−2, y+1), (x−1, y+1), (x, y+1), (x+1, y+1), (x+2, y+1), (x−2, y+2), (x−1, y+2), (x, y+2), (x+1, y+2), and (x+2, y+2).

When ES+E≧ESM (no in S330), on the other hand, the binarization error E(x, y) is not changed, but is distributed to the neighboring twelve pixels in S350. That is, the error E(x, y) is distributed to the neighboring twelve unprocessed pixels in the weighted basis defined also by the predetermined error diffusion matrix Bmat ( ) of FIG. 2 as expressed by the following formula (5):

$$e(x+i, y+j) += Bmat(i,j) \times E(x, y) \quad (5)$$

Thus, the fractions of the error E(x, y) are distributed to the twelve neighboring unprocessed pixels (x+1, y), (x+2, y), (x−2, y+1), (x−1, y+1), (x, y+1), (x+1, y+1), (x+2, y+1), (x−2, y+2), (x−1, y+2), (x, y+2), (x+1, y+2), and (x+2, y+2).

Next, in S360, the binarization error E(x, y) for the subject pixel (x, y) is stored as a newly-determined error value ERR(s) in the working memory 19. It is noted that when the x-coordinate of the subject pixel (x, y) is lower than twelve (12), the binarization error E(x, y) is set to the value ERR(s) (where s=x+1). When the x-coordinate of the subject pixel (x, y) is equal to or higher than twelve (12), the present values ERR(1) through ERR(12) which have been set in S360 of the latest routine are shifted one by one to ERR(0) through ERR(11), and the present binarization error E(x, y) is set to the value ERR(12).

Thus, the error distribution process of S190 is completed. When the error distribution process of S190 is completed, the program proceeds to S200 where it is judged whether or not all the pixels in the present pixel line along the main scanning direction (x direction) have been processed. When any pixels remain unprocessed (no in S200), a pixel position is shifted to the next pixel position (x+1, y) in the same pixel line in S210. That is, x is incremented by one. Then, the process returns to S130. The process from S130 is repeated.

When all the pixels have been processed in the subject pixel line (yes in S200), on the other hand, it is judged in S220 whether or not all the pixels in the input image have been processed. When any pixels remain unprocessed (no in S220), the pixel position is shifted to the next pixel line in the auxiliary scanning direction (y direction) in S230. That is, y is incremented by one. Then, the process returns to S120, and the process from S120 is repeated. When all the pixels have been processed (yes in S220), on the other hand, this process ends.

At this time, the output image data memory 18 stores therein binary density data O(x, y) set in S170 or S160 for each of all the pixel positions (x, y) of the input image. The binary density data O(x, y) for all the pixel positions represent a pseudo-halftone image for the inputted continuous tone image.

As described above, in S315 of the error distribution process of S190, the accumulated error ES is added with the binary conversion error ERR(s) for a pixel (x−1, y) that has been processed immediately before the subject pixel (x, y). If the accumulated error ES has already been a sum of errors originated from twelve already-processed pixels (x−13, y)– (x−2, y), the binary conversion error ERR(s−12), which has been obtained at the pixel (x−13, y) that has been processed oldest in the thirteen already-processed pixels (x−13, y) through (x−1, y), is subtracted from the sum of the values ERR(s) and ES. If the accumulated error ES has not yet been accumulated with twelve errors, on the other hand, this subtraction operation is not performed. Only the binary error ERR(s) obtained at the preceding pixel (x−1, y) is added to the accumulated error ES. Thus, the accumulated error ES is calculated as accumulation of binary conversion errors ERR which have been produced at twelve, at maximum, pixels that are successively arranged preceding the subject pixel along the main scanning direction.

Thus, according to the present embodiment, the accumulated error ES is calculated through accumulating binarization errors E obtained for already-processed preceding twelve, at maximum, pixels. When the sum of the accumulated error ES and the binarization error E(x,y) for the subject pixel becomes a negative value lower than the predetermined value ESM, the absolute value of the binarization error E(x,y) for the subject pixel is decreased before the binarization error is distributed to neighboring unprocessed pixels.

More specifically, when the binary conversion process enters from a high density region into a pixel line of a lower density region, pixels on that pixel line are successively turned OFF and the sum value ES+E becomes lower than the value ESM. According to the present embodiment, the absolute values of the binary conversion errors, obtained for those pixels, are decreased in S340 before the binary conversion errors are distributed to their neighboring pixels. More specifically, pixels in the leading area of the low density region have received in S140 fractions of errors originated from the high density region. Those errors originated from the high density region are negative, and have large absolute values. Accordingly, when those pixels in the leading end of the low density region are converted into binary values, binary conversion errors obtained for those pixels become still negative and have large absolute values. According to the present embodiment, therefore, the absolute values of the binary conversion errors are decreased before the binary conversion errors are distributed to unprocessed neighboring pixels. It is therefore possible to prevent the large-absolute negative errors, originated from the high density region, from being distributed as they are to the low density region. It is therefore possible to prevent the undesirable whitened area from being formed in the leading area of the low density region.

When densities of pixels in the high density region are converted into binary values, the judgment in S310 will highly possibly be affirmative and the absolute value of the accumulated error ES will highly possibly be around a value of zero (0). The judgment in S330 will become highly possibly negative. Accordingly, the binary conversion errors E(x, y) will be distributed as they are to their neighboring unprocessed pixels in S350. Accordingly, the high density region will not suffer from any undesirable density changing problem.

More specifically, if the judgment process of S310 and the ES clearing process of S320 are not provided, many pixels in the high density region will also be subjected to the adjustment process of S340. This is because many pixels will be turned ON in the high density region. Conversion errors obtained in the high density region will therefore become negative values with large absolutes. The sum value ES+E will become lower than the predetermined value ESM. Accordingly, many pixels will be subjected to the adjustment process of S340. The adjustment process of S340 is equivalent to adding conversion errors E(x,y) with positive values. The adjustment process of S340 will therefore serve to distribute, to unprocessed neighboring pixels, errors whose amounts are larger than original amounts which should be distributed according to the original densities. The possibility, that the neighboring pixels will be turned ON, is greatly increased. As a result, the number of pixels, which are actually turned ON in the high density region, becomes greatly larger than the number of pixels which should be turned ON according to the original density data I of the high density region. The density of the high density region will therefore become higher than the desired density. Considering this density changing problem, the processes S310 and S320 are provided according to the present embodiment so that pixels in the high density region will not be subjected to the adjustment process of S340. Density of the high density region can be reproduced into a desired accurate density.

When the conversion process enters from the high density region to the low density region, the absolute values of the binary conversion errors E are decreased in S340 before the binary conversion errors E are distributed to neighboring unprocessed pixels, thereby preventing the occurrence of the undesirable whitened area. Afterward, when the processes are succeeded to reach remaining areas in the low density region, the judgment in S310 will highly possibly become negative. However, the sum ES+E will not become a negative value having a large absolute, and therefore the sum value ES+E will become equal to or higher than the value ESM. The judgment in S330 will become negative, and the binary conversion errors E will be distributed as they are to unprocessed neighboring pixels in S350. Density in those areas in the low density region, that are located away from the high density region, can also be accurately reproduced. The density in those areas will not be undesirably increased through the adjustment process of S340.

It is noted that when the subject pixel is turned ON and the accumulated error ES is cleared at the subject pixel in S320, accumulation of binary conversion errors into the accumulated error ES will be started when a pixel is turned OFF for the first time thereafter. It is now assumed that a negative error E is obtained and stored as a value ERR(s) at a pixel in a high density region, that the conversion process is then transferred from the high density region toward a low density region, and that pixels are successively turned OFF in a leading area of the low density region. In this case, the accumulated error ES will likely become a negative value with a large absolute.

That is, when the subject pixel (x, y) is located within some high density region, the subject pixel (x, y) is turned ON. For the turned-ON pixel, the accumulated error ES is cleared to zero (0) in S320. Accordingly, the judgment in S330 becomes reliably negative. Pixels in the high density region will not be subjected to the adjustment process of S340. On the other hand, because of the processes of S310 and S320, pixels in the leading area of the low density region will be reliably subjected to the adjustment process of S340. If the processes of S310 and S320 are not provided, pixels in the high density region will also be subjected to the adjustment process of S340 as described already. As a result, the absolute values of errors, obtained in the high density region, are decreased. Accordingly, even after the process enters the low density region, the accumulated error ES will not become a negative value with a large absolute. Pixels in the low density region will not be subjected to the adjustment process of S340. Because the processes of S310 and S320 are provided in the present embodiment, the accumulated error ES will become a negative value with a large absolute when the process enters the low density region. The adjustment process of S340 can be reliably performed to prevent the large-absolute negative error E(x, y) from being entirely distributed to the low density region.

It is noted that when the subject pixel is turned ON in S310 (yes in S310), the value ES is cleared to zero (0) in S320, and therefore the negative judgment will likely occur in S330. Thus, pixels in the high density region are reliably subjected to the general error distribution process of S350. It is noted, however, that almost the same effects can be obtained when the process of S350 is performed directly after the affirmative judgment in S310. In this case, every time the process of S315 is attained, accumulation calculation is achieved onto already-processed twelve preceding pixels.

As described above, according to the present embodiment, when the subject pixel has been turned OFF (no in S310), the accumulated error value ES is calculated based on the binary conversion error ERR in S315. Then, the sum of the value ES and the binary conversion error E for the subject pixel is compared with the predetermined value ESM in S330. When the sum is less than the value ESM, the binary conversion error E for the subject pixel is multiplied with the coefficient k so that the absolute of the value E is decreased. Then, the absolute-decreased error E is distributed to unprocessed neighboring pixels according to the error distribution matrix Bmat( ) in S340. Then, the error E for the subject pixel is stored in S360 in the working memory 19 as a binary conversion error ERR(s) for the s-th pixel to be used during the process S315 for the next pixel.

A second embodiment will be described below in greater detail with reference to FIG. 7.

Figure 7:
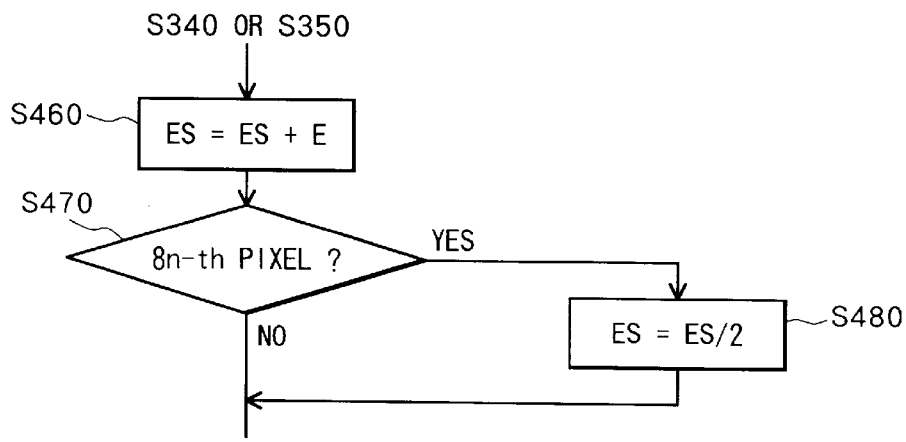
FIG. 7 is a flowchart of a part of the error diffusion process according to a second embodiment.

This embodiment is the same as the above-described first embodiment except that the process of S315 is not executed in the present embodiment and that the process of FIG. 7 is attained in place of S360.

That is, after the process of S340 or S350 is completed, the present value of the accumulated error ES, which has been calculated for the preceding pixel (x−1, y), is added with the binarization error E(x, y) of the subject pixel in S460. Then, it is judged in S470 whether or not the subject pixel (x, y) is a 8n-th pixel along the main scanning direction x at the corresponding pixel line where n is an integer higher than zero (0) and therefore 8n is a multiple of eight (8). In other words, the process of S470 is provided to judge whether or not the x-coordinate of the subject pixel (x, y) is equal to any multiples of eight, that is, eight, sixteen, and etc.

When the x-coordinate is not equal to 8n (no in S470), the error distribution process of S190 is ended. When x is equal to 8n (yes in S470), on the other hand, the accumulated error ES is decreased to its half value in S480.

Thus, according to the present embodiment, the accumulated error ES is decreased as a half of the original value ES when the subject pixel reaches the last pixel in every eight successive pixels. In the first embodiment, it is necessary to store at least twelve binary errors ERR in order to maintain the present error values ERR for twelve, at maximum, successive pixels for calculating the accumulated value ES. According to the present embodiment, however, the accumulated error ES may be merely decreased into a half of its original value at the last pixel in every eight successive pixels. Accordingly, there is no need to store the twelve binary conversion errors ERR.

Also in the processes of S460 through S480, almost the same values as obtained in the first embodiment can be obtained. Almost the same advantages are obtained as in the first embodiment.

In the above-described first and second embodiments, the judgment is performed based on accumulation of error values ERR(s) for the preceding pixels that have been successively processed immediately before the subject pixel. This accumulation is performed onto twelve successive preceding pixels located on the same pixel line with the subject pixel. However, this accumulation can be performed onto pixels located not only on the same pixel line with the subject pixel but also on a pixel line preceding that pixel line. The accumulation can be performed onto pixels on more than two lines preceding the subject pixel line.

In the above description, it is judged whether the process enters from a high density region toward a subsequent low density region through merely judging the accumulated value of the binary conversion errors ERR. However, it may be judged whether the process enters from the high density region toward the low density region through detecting a pattern how the binary conversion error ERR changes as the conversion process is performed onto successive pixels. Based on this judgment, it may be possible to determine which of the processes of S340 and S350 should be executed.

In the first and second embodiments, the sum of the accumulated error ES and the binary conversion error E of the subject pixel is compared with the predetermined value ESM. However, the accumulated error ES may not be added with the binary conversion error E of the subject pixel. Only the accumulated error ES may be compared with the predetermined value ESM.

In the first and second embodiments, the error diffusion method is used for converting the input density into a binary value while distributing the obtained error into unprocessed neighboring pixels. However, other various types of error distribution binary conversion methods can be used. In any of the error distribution binary conversion methods, densities of a plurality of pixels are successively converted into binary values through comparing the subject pixel densities with a predetermined threshold value, while binary conversion errors, defined between the original pixel densities and the binary values, are affected onto unprocessed neighboring pixels. According to the present invention, the degree, at which the binary conversion error obtained at the subject pixel is affected to its neighboring unprocessed pixels, is adjusted dependently on a state of the binary conversion errors obtained at already-processed pixels which are located preceding the subject pixel.

When a minimized average error method is employed, for example, the sum of errors obtained at the already-processed preceding pixels is calculated, and if the calculated value is smaller than a predetermined negative value, the absolute of the error, which will be distributed to unprocessed neighboring pixels, is adjusted to be decreased.

The minimized average error method-employed image conversion process according to a third embodiment of the present invention will be described below in greater detail with reference to FIGS. 8 through 10.

Figure 8:
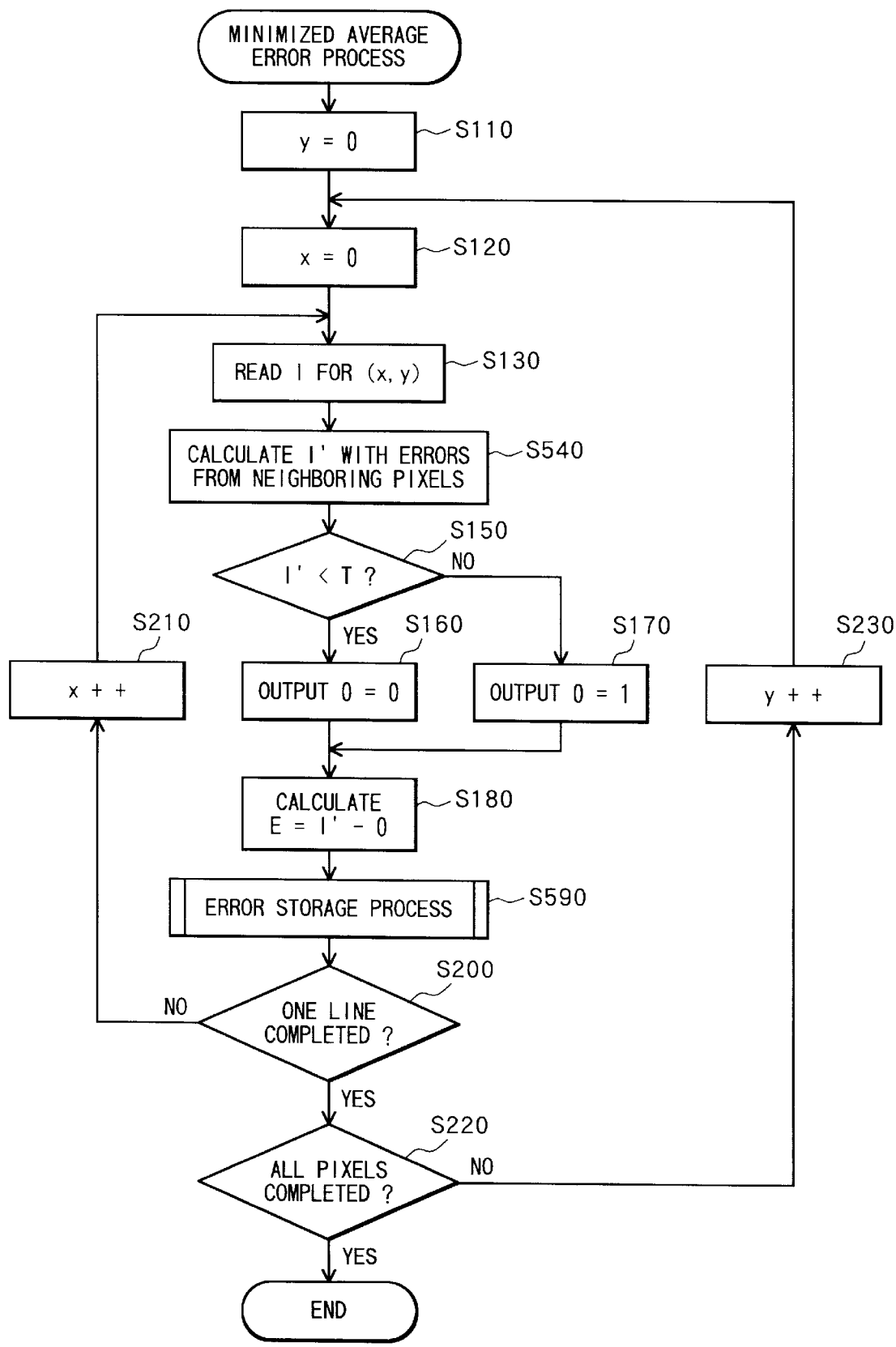
FIG. 8 is a flowchart of a minimized average error method-employed image conversion process according to a third embodiment.

The minimized average error method-employed image conversion process as shown in FIG. 8 is the same as the error diffusion image conversion process of FIG. 5 except that the input density modification process of S140 is replaced with another input density modification process of S540 and that the error distribution process of S190 is replaced with an error storage process of S590.

That is, according to the minimized average error method, before being converted into a binary value, the input density of each pixel is modified with fractions of errors distributed from already-processed twelve neighboring pixels. That is, the Input density I of the subject pixel (x, y) is modified in S540 through receiving binary conversion errors, that have been produced during binary conversion processes performed already onto twelve neighboring pixels (x+i, y+j) and that have been stored in the corresponding memory locations in the error buffer 16. The input density I of the subject pixel (x, y) is added with the binary conversion errors in a weighted basis defined by a predetermined error diffusion matrix Cmat( ) shown in FIG. 10.

In the matrix Cmat( ), * indicates a subject pixel position (x, y), and each value In the matrix indicates a coefficient to be multiplied with an error e(x+i, y+j) obtained at a neighboring already-processed pixel (x+i, y+j), that is located relative to the subject pixel (x, y) as shown In the matrix, the multiplied result being added to the subject pixel density I. Thus, error fractional portions distributed from already-processed neighboring pixels (x+i, y+j) are added to the input density I. For example, the input density I of the subject pixel (x, y) receives a $7/48^{th}$ part of an error e(x−1, y) from a pixel (x−1, y) that is immediately preceding the subject pixel (x, y) on the same pixel line.

Thus, the input density I of the subject pixel (x, y) is modified into a modified density I' through the following formula (6):

$$I' = I + (1/48) \times e(x-2, y-2) + \qquad (6)$$
$$(3/48) \times e(x-1, y-2) +$$
$$(5/48) \times e(x, y-2) +$$
$$(3/48) \times e(x+1, y-2) +$$
$$(1/48) \times e(x+2, y-2) +$$
$$(3/48) \times e(x-2, y-1) +$$
$$(5/48) \times e(x-1, y-1) +$$
$$(7/48) \times e(x, y-1) +$$
$$(5/48) \times e(x+1, y-1) +$$
$$(3/48) \times e(x+2, y-1) +$$

-continued $$(5/48) \times e(x-2, y) +$$

$$(7/48) \times e(x-1, y)$$

The modified value I' is compared with the threshold T in S150 in the same manner as in the error diffusion image conversion process of FIG. 5. A binary conversion error E(x, y) is calculated in S180 also in the same manner as in the error diffusion image conversion process of FIG. 5.

The error storage process of S590 will be described below. This error storage process is for determining how to store the produced binary conversion error E(x, y) into the corresponding memory location (x, y) of the buffer memory 16 as a corresponding error e(x, y).

Figure 9:
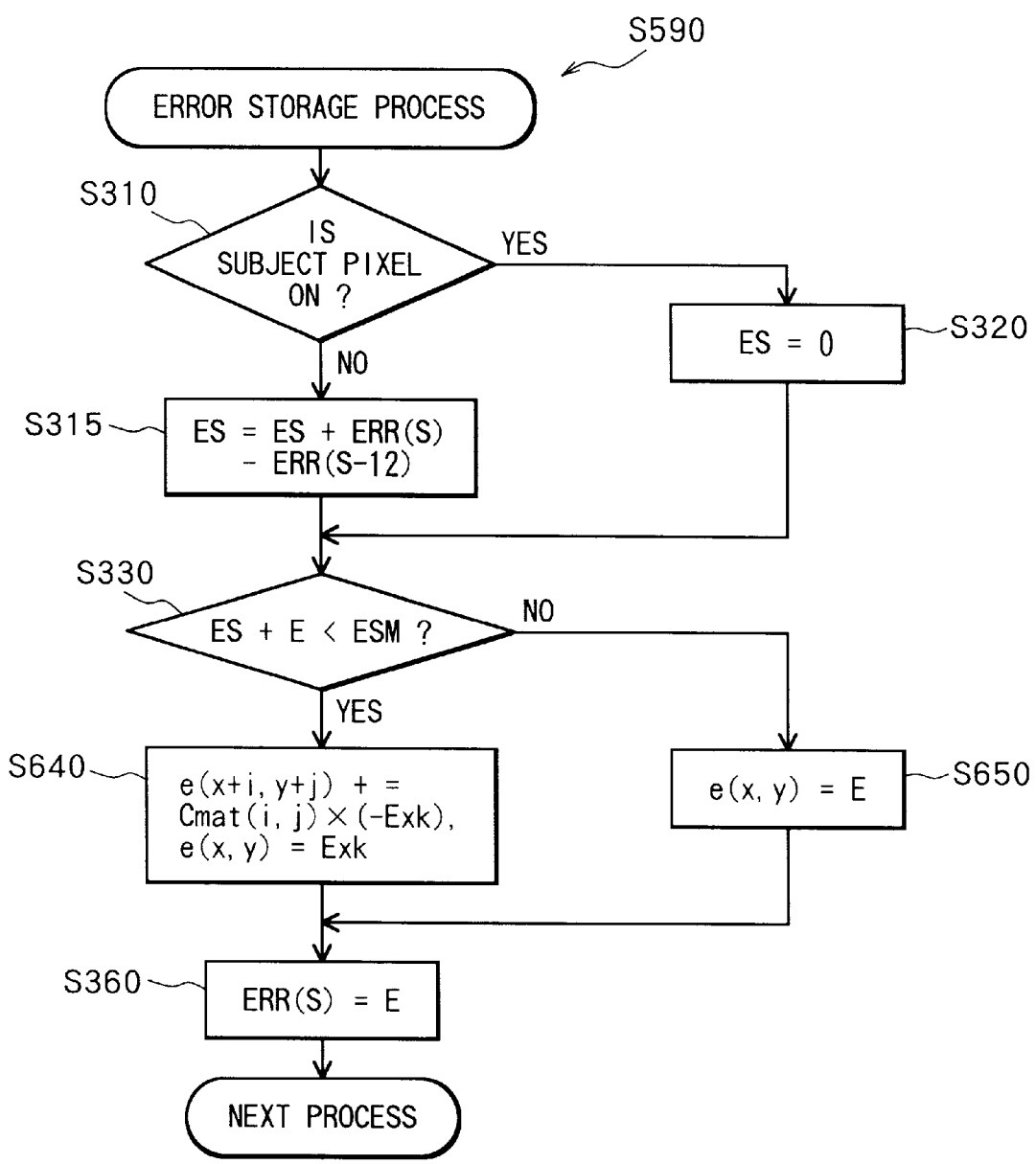
FIG. 9 is a flowchart of an error storage process in the process of FIG. 8.

The process of S590 is shown in FIG. 9. This process is the same as the error diffusion process of S190 shown in FIG. 6 except that the processes of S340 and S350 are replaced with the processes of S640 and S650. That is, when the judgment in S330 is negative, the binary conversion error E(x, y) is merely stored as the corresponding error e(x, y). However, when the judgment in S330 is affirmative, the binary conversion error E(x, y) is multiplied with the coefficient k (where 0<k<1) before being stored as the corresponding error e(x, y).

Figure 10:
FIG. 10 illustrates an error distribution matrix Cmat( ) used in the process of FIGS. 8 and 9.

Then, the sign of the adjusted error k×E(x, y) is reversed, and is fractionally distributed to the neighboring already-processed twelve pixels in a weighted basis defined by the matrix Cmat( ) of FIG. 10. That is, the positive error "−k×E(x, y)" is distributed back to the neighboring twelve already-processed pixels in the weighted basis defined by the predetermined error diffusion matrix Cmat( ) of FIG. 10 as expressed by the following formula:

$$e(x+i, y+j) +\!= Cmat(i,j) \times [-k \times E(x, y)]$$

where += is an operator for calculating a sum of a distributed fraction of the sign-reversed adjusted error "−k× E(x, y)" and a value already stored in the error buffer (x+i, y+j) and for storing the calculated sum into the same error buffer (x+i, y+j). In the matrix Cmat( ), * indicates a subject pixel position (x, y), and each value in the matrix indicates a coefficient to be multiplied with the error −k×E(x, y) before being distributed to a neighboring pixel (x+i, y+j), which is located relative to the subject pixel (x, y) as shown in the matrix. The thus distributed error fractional portion is accumulated in a corresponding memory location (x+i, y+j) in the error buffer according to the above-described formula. For example, the preceding pixel (x−1, y) on the same pixel line with the subject pixel (x, y) receives a $7/48^{th}$ part of the error "−k×E(x, y)". The $7/48^{th}$ part of the error "−k×E(x, y)" is therefore accumulated in the corresponding memory location (x−1, y) of the error buffer. Thus, the sign-reversed adjusted error "−k×E(x, y)" is fractionally distributed back to the already-processed twelve neighboring pixels (x−2, y−2), (x−1, y−2), (x, y−2), (x+1, y−2), and (x+2, y−2), (x−2, y−1), (x−1, y−1), (x, y−1), (x+1, y−1), (x+2, y−1), (x−2, y), and (x−1, y).

When ES+E<ESM, it is confirmed that the errors obtained at the already-processed preceding pixels have negative values with large absolutes. Accordingly, the positive error "−k×E(x, y)" is fractionally distributed back to the errors of the already-processed neighboring pixels. Accordingly, a pixel (x+1, y) to be processed next will receive, from those already-processed neighboring pixels, errors whose absolutes have been adjusted to be decreased. According to this adjustment operation, therefore, turned-ON dots will appear even at the transition area from the high density region toward the low density region. It is possible to prevent occurrence of the undesirable whitened operation.

In the above-described embodiments, the binary conversion process is achieved in the computer system side, and the obtained pseudo-halftone image data is outputted from the display 22 or the printer 24. However, the binary conversion process can be achieved in the printer side.

Figure 11:
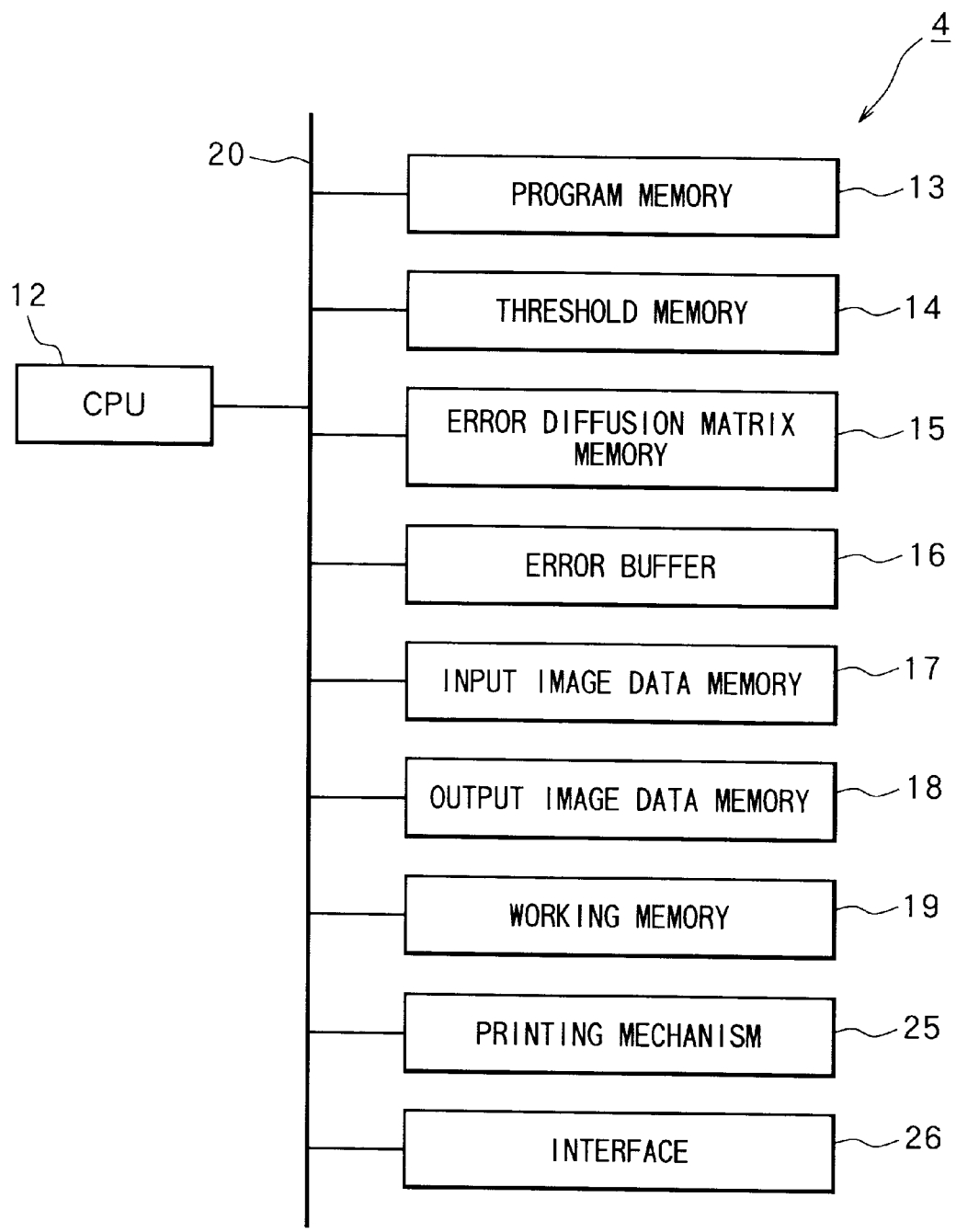
FIG. 11 is a block diagram of a printer according to a modification of the present invention.

For example, a printer 4 can be constructed as shown in FIG. 11 so that the printer 4 can convert inputted continuous tone images into pseudo-halftone images. The same numerals in FIG. 11 correspond to the same or like portions in the device 2 of FIG. 4.

The printer 4 is therefore constructed from: a CPU 12; a program memory 13 constructed from a ROM; a threshold storage portion 14 constructed from a RAM; an error distribution matrix storage memory 15 constructed from another RAM; an error buffer 16 also constructed from another RAM; an input image memory 17 also constructed from another RAM; an output image memory 18 constructed from still another RAM; a working memory 19 constructed from another RAM; a printing mechanism 25; and an interface 26. Thus, the printer 4 is the same as that of the computer 2 of FIG. 4 except that the printer 4 is not provided with the key board 21, the display 22, the external storage device 23, or the printer 24 and that the printer 4 is provided with the printing mechanism 25 and the interface 26.

The printing mechanism 25 is constructed from a printing head such as an ink jet print head for ejecting ink and a mechanism for feeding a paper relative to the print head. The interface 26 is for transmitting data to and receiving data from a host computer (not shown).

With this structure, the printer 4 receives character code data and command data via the interface 26 from a host computer (not shown). The printer 4 converts a continuous tone image represented by the character code data into a pseudo-halftone image through the binary conversion process in the same manner as described above. Then, the printer 4 controls the printing mechanism 25 to print the pseudo-halftone image.

Thus, the printer 4 can also obtain advantages the same as those of the above-described embodiments.

While the invention has been described in detail with reference to specific embodiments thereof, it would be apparent to those skilled in the art that various changes and modifications may be made therein without departing from the spirit of the invention.

For example, in the above description, each pixel line is processed from left to right. However, each pixel line is processed from right to left. Or, the successive pixel lines can be processed both in the direction from left to right and in the other direction from right to left. For example, the successive pixel lines may be processed in the two directions alternately.

What is claimed is:

1. A method for converting continuous tone image data into pseudo-halftone image data, the method comprising the steps of:

successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities; and selectively decreasing an absolute value of the binary conversion error, obtained at each subject pixel to be affected to its neighboring unprocessed pixels, dependently on a state of a binary conversion error obtained for at least one adjacent pixel that has been successively processed immediately prior to the subject pixel.

2. A method as claimed in claim 1, wherein the absolute value decreasing step includes the steps of:

calculating a sum of a binary value conversion error, obtained at the at least one already-processed adjacent pixel that has been successively processed immediately prior to the subject pixel, as defining the state of the binary conversion error obtained for the at least one already-processed adjacent pixel;

judging whether or not the sum is lower than a predetermined negative value; and decreasing, when the sum is judged to be lower than the predetermined negative value the absolute value of the binary conversion error for the subject pixel to be affected to its unprocessed neighboring pixels.

3. A method as claimed in claim 2, wherein the absolute value decreasing step further includes the step of judging whether or not the subject pixel is turned OFF, the calculation of the sum of the binary conversion error being performed when the subject pixel is judged to be turned OFF, to calculate the sum of the binary conversion error, obtained at the at least one already-processed adjacent pixel that has been successively processed immediately prior to the subject pixel and that has been successively converted into a binary value of OFF.

4. A method as claimed in claim 3, wherein the sum calculating step further includes the step of setting, to a value of zero, the sum of the binary conversion error when it is judged that the subject pixel is turned ON.

5. A method as claimed in claim 3, wherein the sum is calculated as including not only the binary conversion error produced at the at least one already-processed adjacent pixel but also the binary conversion error produced at the subject pixel.

6. A method as claimed in claim 2, wherein the absolute value decreasing step includes the step of multiplying the binary conversion error obtained at the subject pixel by a predetermined coefficient which is higher than zero and lower than one.

7. A method as claimed in claim 6, wherein the successively converting step includes the step of converting density data of each pixel into a binary value through comparing the pixel density, modified by an error diffused from already-processed neighboring pixels, with a predetermined threshold value through an error diffusion method, the binary conversion error being diffused into its unprocessed neighboring pixels when the sum of the binary conversion errors for the at least one already-processed adjacent pixel is judged as equal to or higher than the predetermined negative value, the binary conversion error as multiplied with the predetermined coefficient being diffused into its unprocessed neighboring pixels when the sum of the binary conversion error for the at least one already-processed adjacent pixel is judged as lower than the predetermined negative value.

8. A method as claimed in claim 6, wherein the successively converting step includes the step of converting density data of each pixel into a binary value through comparing the pixel density, modified by errors distributed from already-processed neighboring pixels, with a predetermined threshold value through a minimized average error method, the binary conversion error being stored to be used by its unprocessed neighboring pixels when the sum of the binary conversion errors for the at least one already-processed adjacent pixel is judged as equal to or higher than the predetermined negative value, the binary conversion error as multiplied with the predetermined coefficient being stored to be used by its unprocessed neighboring pixels when the sum of the binary conversion error for the at least one already-processed adjacent pixel is judged as lower than the predetermined negative value.

9. A method as claimed in claim 8, wherein a sign of the binary conversion error as multiplied with the predetermined coefficient is reversed and is further distributed onto the already-processed neighboring pixels to be used by its unprocessed neighboring pixels when the sum of the binary conversion error for the at least one already-processed adjacent pixel is judged as lower than the predetermined negative value.

10. A method as claimed in claim 1, wherein the at least one already-processed adjacent pixel include a predetermined number of plurality of successive pixels that are arranged between an immediately-preceding pixel that has been processed immediately before the subject pixel and another pixel that has been processed the predetermined number of times' worth of processes prior to the processing of the subject pixel.

11. A program storage medium for storing data of a program indicative of a process for converting continuous tone image data into pseudo-halftone image data, the program comprising:

a program of successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors beg defined as differences between the original error-affected pixel densities and the binary-converted pixel densities; and a program of selectively decreasing an absolute value of the binary conversion error obtained at each subject pixel to be affected to its neighboring unprocessed pixels, dependently on a state of a binary conversion error obtained for at least one adjacent pixel that has been successively processed immediately prior to the subject pixel.

12. A printer for converting continuous tone image data into pseudo-halftone image data and for printing the pseudo-halftone image, the printer comprising:

means for successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities;

means for selectively decreasing an absolute value of the binary conversion errors obtained at each subject pixel to be affected to its neighboring unprocessed pixels, dependently on a state of a binary conversion error obtained for at least one adjacent pixel that has been successively processed immediately prior to the subject pixel; and means for printing a pseudo-halftone image based on the binary value obtained for each pixel.

13. A program storage medium for storing data of a program indicative of a process for converting continuous tone image data into pseudo-halftone image data, the program comprising:

a program of successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities; and a program of adjusting the degree, at which the binary conversion error obtained at each subject pixel is affected to its neighboring unprocessed pixels, dependently on a state of binary conversion errors obtained for already-processed pixels located adjacent to the subject pixel, wherein the adjusting program includes:
  a program of calculating a sum of binary conversion errors, obtained at the already-processed adjacent pixels, as defining the state of the binary conversion errors obtained for the already-processed adjacent pixels;
  a program of judging whether or not the sum is lower than a predetermined negative value; and
  a program of decreasing the degree, at which the binary conversion error for the subject pixel is affected to its unprocessed neighboring pixels, wherein the degree decreasing program includes a program of multiplying the binary conversion error obtained at the subject pixel by a predetermined coefficient which is higher than zero and lower than one, and wherein the successively converting program includes a program of converting density data of each pixel into a binary value through comparing the pixel density, modified by an error diffused from already-processed neighboring pixels, with a predetermined threshold value through an error diffusion method, the binary conversion error being diffused into its unprocessed neighboring pixels when the sum of the binary conversion errors for the already-processed adjacent pixels is judged as equal to or higher than the predetermined negative value, the binary conversion error as multiplied with the predetermined coefficient being diffused into its unprocessed neighboring pixels when the sum of the binary conversion errors for the already-processed adjacent pixels is judged as lower than the predetermined negative value.

14. A program storage medium for storing data of a program indicative of a process for converting continuous tone image data into pseudo-halftone image data, the program comprising:

a program of successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities; and a program of adjusting the degree, at which the binary conversion error obtained at each subject pixel is affected to its neighboring unprocessed pixels, dependently on a state of binary conversion errors obtained for already-processed pixels located adjacent to the subject pixel, wherein the adjusting program includes:
  a program of calculating a sum of binary conversion errors, obtained at the already-processed adjacent pixels, as defining the state of the binary conversion errors obtained for the already-processed adjacent pixels;
  a program of judging whether or not the sum is lower than a predetermined negative value; and
  a program of decreasing the degree, at which the binary conversion error for the subject pixel is affected to its unprocessed neighboring pixels, wherein the degree decreasing program includes a program of multiplying the binary conversion error obtained at the subject pixel by a predetermined coefficient which is higher than zero and lower than one, and wherein the successively converting program includes a program of converting density data of each pixel into a binary value through comparing the pixel density, modified by errors distributed from already-processed neighboring pixels, with a predetermined threshold value through a minimized average error method, the binary conversion error being stored to be used by its unprocessed neighboring pixels when the sum of the binary conversion errors for the already-processed adjacent pixels is judged as equal to or higher than the predetermined negative value, the binary conversion error as multiplied with the predetermined coefficient being stored to be used by its unprocessed neighboring pixels when the sum of the binary conversion errors for the already-processed pixels is judged as lower than the predetermined negative value.

15. A program storage medium as claimed in claim 14, wherein a sign of the binary conversion en-or as multiplied with the predetermined coefficient is reversed and is further distributed onto the already-processed neighboring pixels to be used by its unprocessed neighboring pixels when the sum of the binary conversion errors for the already-processed adjacent pixels is judged as lower than the predetermined negative value.

16. A printer for converting continuous tone image data into pseudo-halftone image data and for printing the pseudo-halftone image, the printer comprising:

means for successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities;

means for adjusting the degree, at which the binary conversion error obtained at each subject pixel is affected to its neighboring unprocessed pixels, dependently on a state of binary conversion errors obtained for already-processed pixels located adjacent to the subject pixel; and means for printing a pseudo-halftone image based on the binary value obtained for each pixel, wherein the adjusting means includes:
  means for calculating a sum of binary conversion errors, obtained at the already-processed adjacent pixels, as defining the state of the binary conversion errors obtained for the already-processed adjacent pixels;

means for judging whether or not the sum is lower than a predetermined negative value; and means for decreasing the degree, at which the binary conversion error for the subject pixel is affected to its unprocessed neighboring pixels, wherein the degree decreasing means includes means for multiplying the binary conversion error obtained at the subject pixel by a predetermined coefficient which is higher than zero and less than one, and wherein the successively converting means includes means for converting density data of each pixel into a binary value through comparing the pixel density, modified by an error diffused from already-processed neighboring pixels, with a predetermined threshold value through an error diffusion method, the binary conversion error being diffused into its unprocessed neighboring pixels when the sum of the binary conversion errors for the already-processed adjacent pixels is judged as equal to or higher than the predetermined negative value, the binary conversion error as multiplied with the predetermined coefficient being diffused into its unprocessed neighboring pixels when the sum of the binary conversion errors for the already-processed adjacent pixels is judged as lower than the predetermined negative value.

17. A printer for converting continuous tone image data into pseudo-halftone image data and for printing the pseudo-halftone image, the printer comprising:

means for successively converting density data of a plurality of pixels arranged in a continuous tone image into binary values of ON and OFF through comparing the subject pixel densities, which are affected by binary conversion errors obtained for already-processed neighboring pixels, with a predetermined threshold value, binary conversion errors being defined as differences between the original error-affected pixel densities and the binary-converted pixel densities;

means for adjusting the degree, at which the binary conversion error obtained at each subject pixel is affected to its neighboring unprocessed pixels, dependently on a state of binary conversion errors obtained for already-processed pixels located adjacent to the subject pixel; and means for printing a pseudo-halftone image based on the binary value obtained for each pixel, wherein the adjusting means includes:

means for calculating a sum of binary conversion errors, obtained at the already-processed adjacent pixels, as defining the state of the binary conversion errors obtained for the already-processed adjacent pixels;

means for judging whether or not the sum is lower than a predetermined negative value; and means for decreasing the degree, at which the binary conversion error for the subject pixel is affected to its unprocessed neighboring pixels, wherein the degree decreasing means includes means for multiplying the binary conversion error obtained at the subject pixel by a predetermined coefficient which is higher than zero and lower than one, and wherein the successively converting means includes means for converting density data of each pixel into a binary value through comparing the pixel density, modified by errors distributed from already-processed neighboring pixels, with a predetermined threshold value through a minimized average error method, the binary conversion error being stored to be used by its unprocessed neighboring pixels when the sum of the binary conversion errors for the already-processed adjacent pixels is judged as equal to or higher than the predetermined negative value, the binary conversion error as multiplied with the predetermined coefficient being stored to be used by its unprocessed neighboring pixels when the sum of the binary conversion errors for the already-processed adjacent pixels is judged as lower than the predetermined negative value.

18. A printer as claimed in claim 17, wherein a sign of the binary conversion error as multiplied with the predetermined coefficient is reversed and is further distributed onto the already-processed neighboring pixels to be used by its unprocessed neighboring pixels when the sum of the binary conversion errors for the already-processed adjacent pixels is judged as lower than the predetermined negative value.

* * * * *